(12) United States Patent
Li et al.

(10) Patent No.: US 8,626,474 B2
(45) Date of Patent: Jan. 7, 2014

(54) SIMULATION TOOL FOR HIGH-SPEED COMMUNICATIONS LINKS

(75) Inventors: Peng Li, Palo Alto, CA (US); Masashi Shimanouchi, San Jose, CA (US); Thungoc M. Tran, San Jose, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 517 days.

(21) Appl. No.: 12/762,848

(22) Filed: Apr. 19, 2010

(65) Prior Publication Data

US 2011/0257953 A1    Oct. 20, 2011

(51) Int. Cl.
G06F 7/60     (2006.01)
G06G 7/62     (2006.01)
G06F 17/50    (2006.01)

(52) U.S. Cl.
USPC .................................. 703/2; 703/13; 703/14

(58) Field of Classification Search
USPC .................................................. 703/2, 13, 14
See application file for complete search history.

(56) References Cited

U.S. PATENT DOCUMENTS

| | | | |
|---|---|---|---|
| 6,199,032 B1 * | 3/2001 | Anderson | 703/21 |
| 7,133,654 B2 | 11/2006 | Carballo et al. | |
| 7,275,004 B2 * | 9/2007 | Casper et al. | 702/66 |
| 7,426,233 B2 * | 9/2008 | Richards et al. | 375/150 |
| 7,693,691 B1 | 4/2010 | Tao et al. | |
| 8,000,931 B2 * | 8/2011 | Ichiyama et al. | 702/181 |
| 2004/0268190 A1 * | 12/2004 | Kossel et al. | 714/704 |
| 2005/0111536 A1 | 5/2005 | Cranford et al. | |
| 2005/0152488 A1 | 7/2005 | Buckwalter et al. | |
| 2006/0018374 A1 | 1/2006 | Nelson et al. | |
| 2007/0274378 A1 | 11/2007 | Warke | |
| 2009/0094302 A1 | 4/2009 | Hollis et al. | |
| 2010/0106457 A1 * | 4/2010 | Ichiyama et al. | 702/181 |

OTHER PUBLICATIONS

Li, Peng. U.S. Appl. No. 12/250,465, filed Oct. 13, 2009.
Turudic, Andy, et al. "Pre-Emphasis and Equalization Parameter Optimization with Fast, Worst-Case/Multibillion-Bit Verification," Altera Corporation, Jan. 2007.

* cited by examiner

*Primary Examiner* — Omar Fernandez Rivas
*Assistant Examiner* — Nithya J Moll
(74) *Attorney, Agent, or Firm* — Treyz Law Group; Jason Tsai

(57) ABSTRACT

A link simulation tool for simulating high-speed communications link systems is provided. Communications links may include link subsystems such as transmit (TX) circuitry, receive (TX) circuitry, oscillator circuits that provide reference clock signals to the TX and RX circuitry, and channels that link the TX and RX circuitry. The link simulation tool may model each of the subsystems using behavioral models. The behavioral models may include characteristic functions such as transfer functions, probability density functions, and eye characteristics. The link simulation tool may have a link analysis engine that is capable of performing two-dimensional (two-variable) convolution operations and in applying dual-domain (frequency-time) transformations on the characteristic functions provided by the behavioral models to simulate the performance of the link system. The link simulation tool may have an input screen that allows a user to specify desired link parameters and a data display screen that display simulated results.

15 Claims, 17 Drawing Sheets

SIMULATION TOOL FOR HIGH-SPEED COMMUNICATIONS LINKS

BACKGROUND

This relates generally to communications links, and more particularly, to high-speed input-output (I/O) communications links.

A typical communications link includes a transmitter (TX) module, a receiver (RX) module, and a channel that connects the TX module to the RX module. The TX module transmits a serial data bit stream across the channel to the RX module. Typical high-speed transmit data rates can be as high as 10 Gbps (gigabits per second). Communications links operating at such high data rates are often referred to as high-speed serial links or high-speed I/O links.

Circuit simulation tools such as SPICE have been used to simulate the behavior of communications links. The TX module of a communications link generally includes a driver circuit. SPICE can simulate the deterministic behavior of the driver circuit, but neglects non-deterministic effects such as noise and jitter. Simulating a communications link at a transistor level using HSPICE can often take hours or days for sufficient test coverage. Such long testing times are undesirable.

Behavior-based simulation tools have been developed to overcome the shortcomings of HSPICE. The pre-emphasis equalization link estimator (PELE) available from Altera Corporation of San Jose, Calif. is an example of a behavior-based simulation tool. The PELE takes into account deterministic characteristics and performs simulations based on one-dimensional statistical modeling (e.g., this tool models deterministic sources that affect the timing but not the amplitude of transmitted signals) to determine the optimal coefficients for TX pre-emphasis and RX linear equalizations. As a result, the PELE and other conventional behavior-based simulation tools are not always able to model high-speed communications links such as links that operate at data rates greater than 10 Gbps as accurately as desired, because random characteristics such as random jitter and noise are not taken into account.

It would therefore be desirable to be able to provide an improved simulation tool that can effectively simulate modern high-speed communications links.

SUMMARY

A link simulation tool for simulating high-speed communications links is provided.

A communications link may include transmit (TX) circuitry, receive (RX) circuitry, and a channel that links the TX and RX circuitry. The TX circuitry may include a TX data module, a TX equalizer, a driver, a TX phase-locked loop (PLL), and a TX oscillator. The TX data module may feed data to the TX equalizer. The TX equalizer may output data to the driver. The TX PLL may receive a reference clock signal from the TX oscillator and may control the timing of the TX data module, TX equalizer, and driver to operate at a desired transmit data rate. The driver may output signals with sufficient strength across the channel.

The TX circuitry may include a buffer, an RX equalizer, a register (e.g., a flip-flop), an RX data module, an RX PLL, and an RX oscillator. The TX and RX oscillators may be formed on-chip or off-chip. The buffer may receive signals transmitted over the channel. The buffer may output signals to the RX equalizer. The RX equalizer may provide signals to the register for latching. The flip-flop may feed latched data to the RX data module. The RX PLL may receive a reference clock signal from the RX oscillator and may include a clock recovery circuit (CRC) that generates a recovered data clock signal with a recovered clock rate based on the data rate of the received signals. The RX PLL may control the timing of the RX equalizer, the register, and the RX data module to operate at the recovered clock rate.

The TX circuitry, the RX circuitry, and the channel may be represented by respective behavioral models. These behavioral models may include characteristic transfer functions, probability density functions (PDF), eye diagrams, etc. The link simulation tool may perform two-dimensional convolution and dual domain transformations (e.g., frequency-to-time domain transformations such as fast Fourier transformations FFT or Laplace transformations) on these characteristic functions to model the behavior of each link subsystem for each of the communications links that are being simultaneously simulated.

The link simulation tool may provide an input screen that presents a user with an opportunity to specify link simulation tool settings. The link simulation tool settings input screen allows the user to specify a desired data rate, data pattern file, channel model file, TX/RX settings, jitter and noise levels, and other settings.

The link simulation tool may also provide a data display screen that presents the user with an opportunity to adjust data display settings. The data display screen allows the user to specify a desired plot setting, test point, target bit error rate (BER), eye plot type, axis scale, etc. The data display screen may display corresponding data plots such as a 2D eye diagram, noise and jitter histograms, a 3D BER eye plot, associated BER plots (e.g., bathtub curves), eye opening characteristics (e.g., eye height and eye width), etc.

The link simulation tool may include a link analysis engine that performs simulation computations. The link simulation tool may provide simulation results to custom logic or programmable logic design tools for use in designing high-speed communication links for application-specific integrated circuits (ASIC) or programmable logic device (PLD) integrated circuits, respectively.

Further features of the present invention, its nature and various advantages will be more apparent from the accompanying drawings and the following detailed description.

DETAILED DESCRIPTION

This relates to communications links, and more particularly to simulation tools that simulate the performance of communications links.

Communications links are commonly used to transport data between separate integrated circuits packages, printed circuit boards, etc. Such communications links may be used to connect integrated circuits that include communications capabilities, such as memory chips, digital signal processing circuits, microprocessors, application specific integrated circuits, programmable logic device integrated circuits, field-programmable gate arrays, application specified standard products, or any other suitable integrated circuit.

Figure 1:
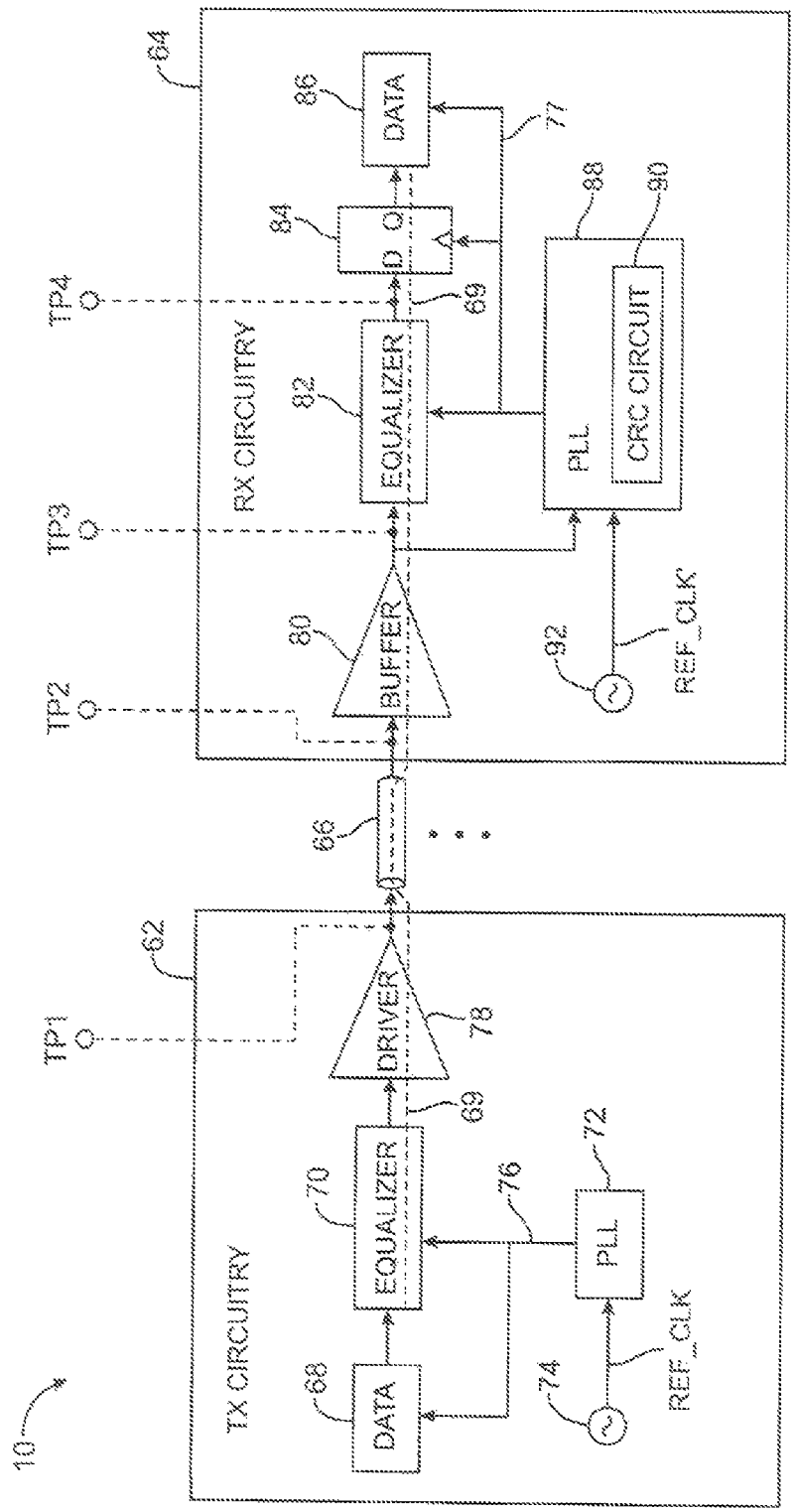
FIG. 1 is a circuit block diagram of an illustrative communications link in accordance with an embodiment of the present invention.

Systems in which the links carry high-speed digital signals are typically among the most challenging to design. A high-speed link might, as an example, carry data at several gigabits per second. A high-speed communications link is shown in FIG. 1. Communications link 10 may include transmitter (TX) circuitry such as TX circuitry 62, a channel such as channel 66, and receiver (RX) circuitry such as RX circuitry 64. Channel (channel subsystem) 66 may connect TX circuitry 62 to RX circuitry 64.

TX circuitry 62 may be formed on a first integrated circuit while RX circuitry 64 may be formed on a second integrated circuit (as an example). The first and second integrated circuits may be mounted on a printed circuit board (PCB). Channel 66 (e.g., conductive traces on the PCB, wires, copper cables, etc.) may be used to connect the first and second integrated circuits. The first integrated may use TX circuitry 62 to transmit data to RX circuitry 64 in the second integrated circuitry through channel 66. If desired, more than one channel may be used to link TX circuitry 62 to RX circuitry 64.

This example is merely illustrative. Communications link 10 of the type described in connection with FIG. 1 may be used provide data transport between integrated circuits, printed circuit boards, circuits within a single integrated circuit, etc.

TX circuitry 62 may include a TX data source such as data source 68, a TX equalizer such as equalizer 70, a TX driver such as driver 78, a TX phase-locked loop (PLL) such as PLL 72, and a TX oscillator such as oscillator 74. Data source 68 may provide data to be transmitted. For example, data source 68 may be a parallel-in serial-out (PISO) data circuit or a serializer. In this example, data source 68 may provide TX circuitry 62 with a serial data bit stream for transmission.

Equalizer 70 may receive data from data source 68. Equalizer 70 may be used to provide high-frequency and direct signal level boosting to compensate for high-frequency signal loss commonly seen in high-speed serial links (e.g., losses in copper-based channels that exhibit undesired low-pass transfer characteristics that result in signal degradation at high data rates) or to enhance signal to noise ratio (SNR) in scenarios in which uncorrelated noise such as crosstalk is present. Equalizer 70 may implement linear equalization schemes such as finite impulse response (FIR) and feed forward equalization (FFE) schemes or nonlinear adaptive equalization schemes such as infinite impulse response (IIR) or decision feedback equalization (DFE) schemes (as examples).

Equalizer 70 may output equalized data to driver 78. Driver 78 may have an output that is connected to a first terminal of channel 66. The output of driver 78 may have an output differential resistance of 10 Ohms to provide impedance matching with channel 66 (e.g., the first terminal of channel 66 has an input differential resistance of 10 Ohms). Impedance matching may provide maximum signal power transfer from driver 78 to channel 66 and may eliminate signal reflection. Driver 78 may be used to provide sufficient drive strength to drive the data stream across channel 66.

PLL 72 may receive reference clock signal REF CLK from oscillator 74. Oscillator 74 may be an on-chip crystal oscillator (as an example). Signal REF CLK may be provided from an off-chip oscillator, if desired. PLL 72 may produce a desired transmit data clock signal over line 76 to control data source 68 and equalizer 70. The data clock signal may have a transmit clock rate that is an integer multiple of the clock rate of reference clock signal REF_CLK. For example, consider a scenario in which signal REF_CLK has a clock rate of 3 GHz. The data clock signal may have a transmit clock rate of 6

GHz, 9 GHz, 12 GHz, 18 GHz, etc. TX circuitry 62 may transmit the serial data bit stream with a transmit data rate that is equivalent to the clock rate of the data clock signal generated by PLL 72. For example, consider a scenario in which the transmit clock rate is 15 GHz. In this type of scenario, driver 78, which is controlled by the corresponding transmit data clock signal, will transmit data at a transmit data rate of 15 Gbps. If desired, data can be transmitted at 30 Gbps if both rising and falling edges of the data clock signal are used to clock the data in half-rate architectures (as an example).

Channel 66 may have a second terminal that is connected to RX circuitry 64. RX circuitry 64 may include an RX buffer such as buffer 80, an RX equalizer such as equalizer 82, a register (e.g., a flip-flop) such as register 84, an RX data destination such as data module 86, an RX PLL such as PLL 88, and an RX oscillator such as oscillator 92.

The second terminal of channel 66 may be connected to an input of buffer 80. Buffer 80 may receive data from channel 66. Buffer 80 may have an input differential resistance of 10 Ohms for impedance matching (e.g., the second terminal of channel 66 has an output differential resistance of 10 Ohms). Buffer 80 may provide additional pre-amplification for the received data, if desired.

Buffer 80 may output the received data to equalizer 82. Equalizer 82 may provide further high-frequency boosting or direct signal level boosting to compensate for any additional undesired high-frequency signal loss. Equalizer 82 may output the received data that has been equalized to register 84. Register 84 may latch desired data and may output the desired data to data source 84. Data source 86 may be a serial-in parallel-out (SIPO) or a de-serializer data circuit (as an example). In this example, data source 86 may convert the serial data bit stream to parallel data for later processing.

Buffer 80 may provide the received data to PLL 88. PLL 88 may include a clock recovery circuit (CRC) such as CRC circuit 90. PLL 88 may receive local reference clock signal REF_CLK' from oscillator 92. Oscillator 92 may be an on-chip crystal oscillator (as an example). Signal REF_CLK' may be generated by an off-chip oscillator, if desired. PLL 72 may use CRC 90 to generate a recovered data clock signal based on the data rate of the received data.

For example, consider a scenario in which the data rate of the received data is 16 Gbps and the clock rate of signal REF_CLK' is 2 GHz. PLL 72 may generate a recovered data clock signal on line 77 that has a recovered clock rate that matches the data rate of the received data. The recovered data clock in this example may therefore exhibit a recovered clock rate of 16 GHz that matches the received data rate of 16 Gbps. The recovered data clock signal is provided over line 77 to control equalizer 82, register 84, and data source 86 to process data at the recovered clock rate.

All the components (e.g., equalizers 70 and 82, driver 78, channel 66, and buffer 80) in the data path indicated by dotted line 69 may be implemented using differential architecture. For example, equalizers 70 and 82 may have differential inputs and differential outputs instead of single-ended inputs and outputs, and the data transmitted over channel 66 may be in the form of differential signals.

Communications link system 10 may be simulated using a link simulation tool. Each link subsystem (e.g., TX circuitry 62, channel 66, or RX circuitry 64) may be simulated using a computer-aided design (CAD) simulation tool that captures the behaviors of each subsystem of the entire link system through the use of behavioral (subsystem) models. For example, first and second subsystem models may be used to model the behaviors of circuitry 62 and 64, respectively. A third subsystem model may be used to model passive characteristics of channel subsystem, 66. Additional behavior models may be used to model more than one channel (e.g., for multi-channel link systems), if desired. If desired, any number of link systems 10 may be simultaneously simulated using the link simulation tool.

The first, second, and third subsystem models can be used to simulate the behavior of link system 10 according to an overall link metric. The overall link metric may be a bit error rate (BER), as an example. The bit error rate is defined as the ratio of the number of error bits (e.g., received bits that have been corrupted by noise, jitter, interference, etc.) to the total number of transmitted bits within a given time period.

For example, consider a scenario in which two terabits were transmitted within five seconds. There may be two incorrect bits that were transferred erroneously. The BER is therefore $10^{-12}$ (2 divided by $2*10^{12}$). For high-speed communications links such as link 10, it may be desirable to set the BER to $10^{-12}$ or smaller (e.g., $10^{-12}$, $5*10^{-14}$, $2.8*10^{-15}$, etc.).

The link simulation may be used to calculate partial link metrics at different test points in link system 10. The test points refer to particular points of interest in communications link 10. For example, a test point TP1 may be located at the output of driver 78, another test point TP2 may be located at the input of buffer 80, TP3 may be located at the output of buffer 80, and TP4 may be located at the output of equalizer 82, as shown in FIG. 1. If desired, any number of test points may be placed at any number of points in link system 10.

The behavioral model of TX circuitry 62 may be implemented using software abstractions of the actual hardware in system 10. For example, TX circuitry 62 may be abstracted into a schematic representation (as shown in FIG. 2) in which each of the components is modeled by an individual characteristic function (e.g., a transfer function, a probability density function, etc.).

Figure 2:
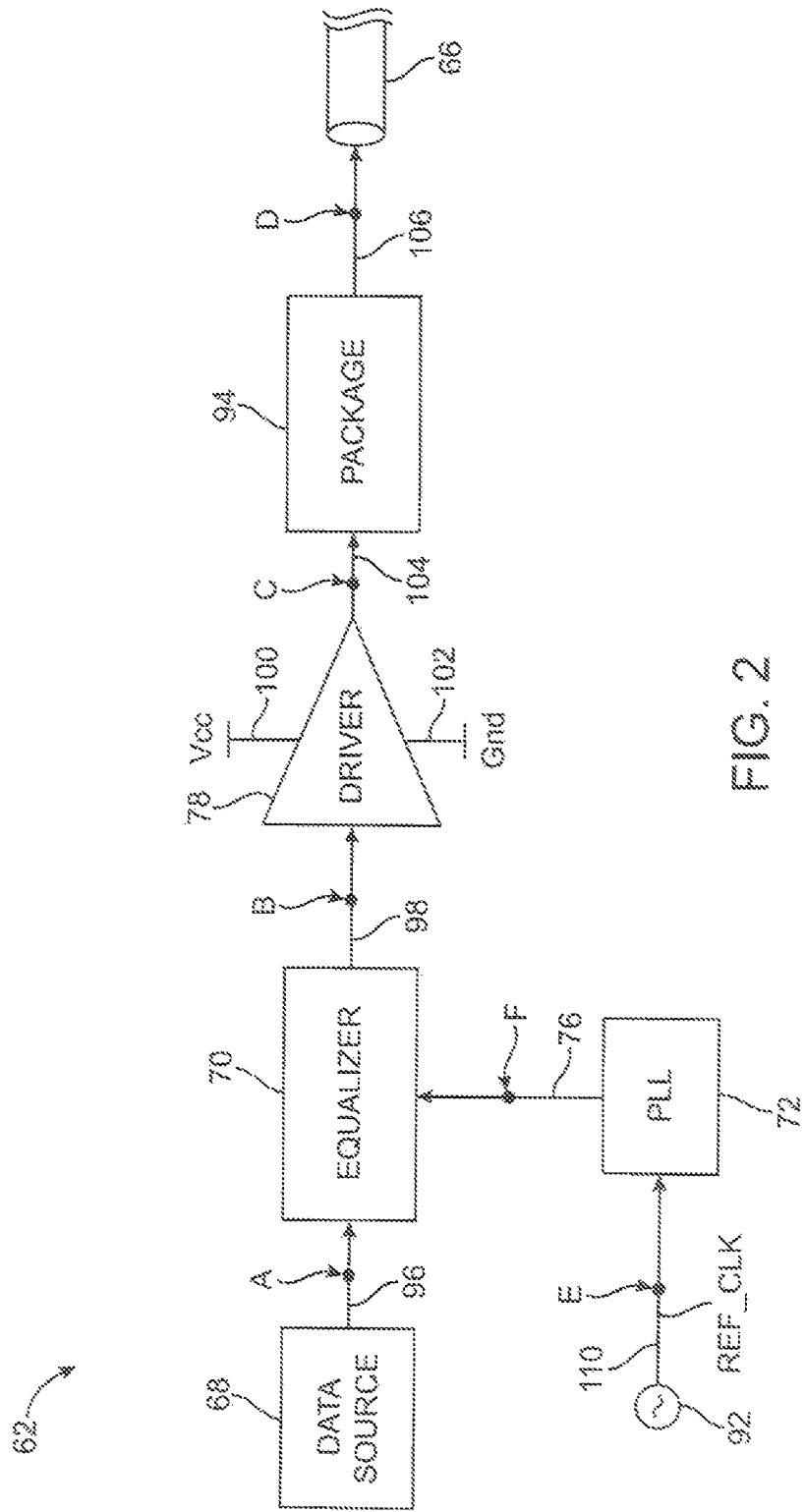
FIG. 2 is a schematic diagram of illustrative transmit (TX) circuitry in accordance with an embodiment of the present invention.

Each connection in FIG. 2 may indicate that two connected components interact with each other and that their respective characteristic functions are related. Data source 68 may be connected to equalizer 70 through line 96. Equalizer 70 may be connected to driver 78 through line 98. Oscillator 92 may provide signal REF_CLK to PLL 72 over line 110. PLL 72 may provided a transmit data clock signal to equalizer 70 over line 76. Driver 78 may be supplied by positive power supply line 100 (e.g., a line that is driven to positive power supply voltage Vcc) and by ground power supply line 102 (e.g., a line that is driven to zero volts or Gnd). Driver 78 may be connected to a TX circuitry package such as TX circuitry package 94. There may not actually be a discrete packaging component in TX circuitry 62. Package 94 merely serves to represent a low-pass characteristic of an integrated circuit package that contains circuitry 62 and that is used for mounting TX circuitry 62 onto a printed circuit board. Schematically, package 94 is connected to channel 66 through line 106. The connections (i.e., lines) in FIG. 2 may represent simulated data flow paths.

It may be helpful to examine the individual characteristic functions at the outputs of data source 68 (as indicated by point A), equalizer 70 (as indicated by point B), driver 78 (as indicated by point C), package 94 (as indicated by point D), oscillator 92 (as indicated by point E), and PLL 72 (as indicated by point F). The mechanism through which these characteristic functions may be combined to simulate an overall link subsystem behavior may sometimes be referred to as convolution (e.g., two-dimensional convolution in the time domain or in the frequency domain).

Figure 3A:
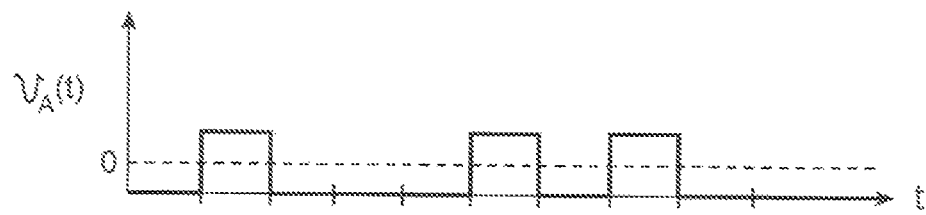
FIG. 3A is a timing diagram of an illustrative data stream generated by a data source in accordance with an embodiment of the present invention.

At point A, a signal such as $v_A(t)$ may be generated by data module 68. Signal $v_A(t)$ may represent a possible data bit stream (e.g., 0100010100) that varies as a function of time, as shown in FIG. 3A. Signal $v_A(t)$ may be a differential signal that is centered at zero volts (as an example).

Figure 3B:
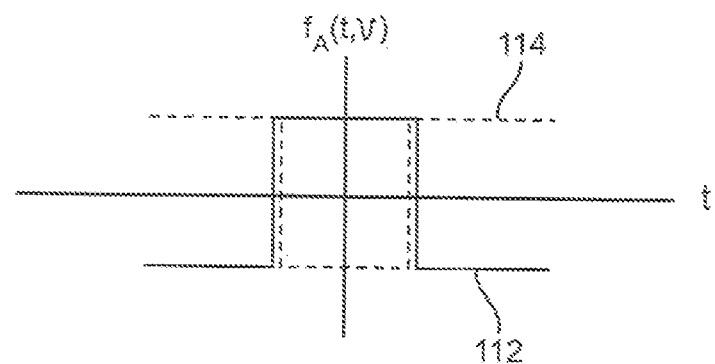
FIG. 3B is an eye diagram of the illustrative data stream of FIG. 3A in accordance with an embodiment of the present invention.

FIG. 3B shows an eye diagram such as eye diagram $f_A(t,v)$. Eye diagram $f_A(t,v)$ may be a two-variable function that is dependent on time and voltage (e.g., time and voltage correspond to the two axes of the eye diagram). Eye diagram $f_A(t,v)$ may be formed by repetitively sampling signal $v_A(t)$ at regular time intervals and by overlaying the sampled signals. For example, waveform 112 may represent samples having a differential value of "1" while waveform 114 may represent samples having a differential value of "0." Diagram $f_A(t,v)$ represents an ideal eye pattern, because the transitions of waveforms 112 and 114 are vertical (e.g., infinite slope) and because no variation in time (e.g., jitter) or voltage (e.g., noise) is present to distort the eye pattern.

Figure 4A:
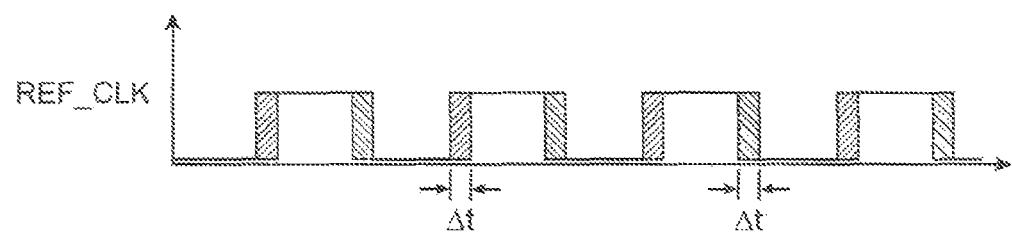
FIG. 4A is a timing diagram of an illustrative reference clock signal with jitter in accordance with an embodiment of the present invention.

At point E, reference clock signal REF_CLK is generated by oscillator 92. Signal REF_CLK may be a square wave clock signal having 50% duty cycle (see, e.g., FIG. 4A). Signal REF_CLK may exhibit more or less than 50% duty cycle, if desired. Oscillator 92 may not produce an ideal square wave. For example, oscillator 92 may generate a square wave having random jitter (e.g., random variation in the time domain) that causes the rising/fallings edges of signal REF_CLK to shift in time, as indicated by $\Delta t$ in FIG. 4A.

Figure 4B:
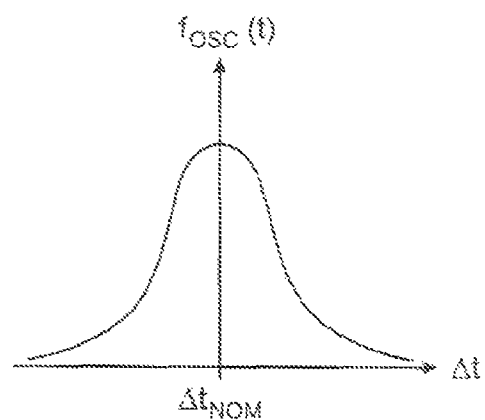
FIG. 4B is a probability density function (PDF) of the reference clock jitter shown in connection with FIG. 4A in accordance with an embodiment of the present invention.

The random jitter of signal REF_CLK may be characterized by a probability density function (PDF) such as probability density function $f_{OSC}(t)$ of FIG. 4B. In general, a probability density function plots the relative likelihood that a random variable with a particular value will occur. PDF $f_{OSC}(t)$ plots the probability for a given jitter to occur as a function of time. For example, PDF $f_{OSC}(t)$ has a peak that corresponds to nominal jitter $\Delta t_{NOM}$. Signal REF_CLK may therefore exhibit random jitter with a value that is approximately equal to nominal jitter $\Delta t_{NOM}$ for a majority of the time (e.g., peak in PDF corresponds to highest probable occurrence). Jitter values that deviate far from the nominal jitter may still occur but with relatively less probability. The random jitter of signal REF_CLK may therefore be uniquely characterized by PDF $f_{OSC}(t)$.

Figure 5:
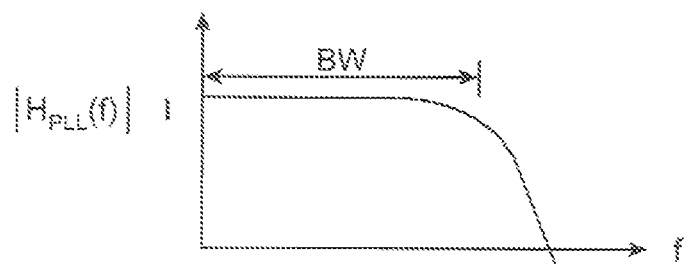
FIG. 5 is a transfer function of an illustrative phase-locked loop (PLL) in accordance with an embodiment of the present invention.

PLL 72 may be characterized by a transfer function such as transfer function $|H_{PLL}(f)|$, as shown in FIG. 5. Transfer function $|H_{PLL}(f)|$ plots the magnitude response of PLL 72 as a function of frequency. Transfer function $|H_{PLL}(f)|$ may have a low-pass characteristic with a finite bandwidth BW. A phase response may be used in conjunction with magnitude response $|H_{PLL}(f)|$ to characterize PLL 72, if desired.

The behavior at the output of PLL 72 may be determined by convolving PDF $f_{OSC}(t)$ with transfer function $|H_{PLL}(f)|$. Convolution is a technique that involves integrating the product of two functions after one is reversed and shifted in the time domain. Convolution takes two functions as inputs and outputs a third function that can be viewed as a cross-correlated version of the two functions.

Generally, convolution of two functions requires that the two functions be either both in the time domain or both in the frequency domain. In a scenario in which the two functions are in different domains, transformations such as the Fourier transform (e.g., fast Fourier transform FFT) or the inverse Fourier transform (e.g., inverse fast Fourier transform IFFT) may be used to convert a function from time domain to frequency domain or from frequency domain back to time domain, respectively. If desired, transformations such as the Laplace transform or the inverse Laplace transform may also be used. Superior throughput can be achieved relative to the conventional SPICE simulation method by the use of dual domain (e.g., time and frequency) operation and fast transformations between them.

Figure 6:
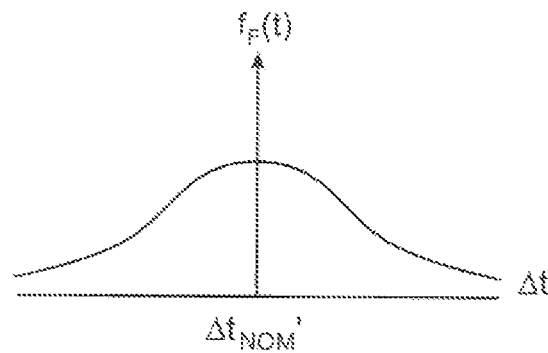
FIG. 6 is a probability density function (PDF) of illustrative phase-locked loop (PLL) jitter in accordance with an embodiment of the present invention.

The output characteristic of PLL 72 (e.g., point F) may be represented by time function $f_F(t)$ and the corresponding PDF, as shown in FIG. 6. In simulation, $f_F(t)$ may be calculated by convolving time function $f_{OSC}(t)$ with $h_{PLL}(t)$ (i.e., an inverse Fourier transform of $|H_{PLL}(f)|$), as shown in equation 1.

$$f_F(t) = f_{OSC}(t) * h_{PLL}(t) \quad (1)$$

In equation 1, the symbol "*" represents the convolution function. If the PLL transfer function exhibits peaking, the corresponding output jitter will be amplified at the frequency at which the peaking occurs.

Figure 7:
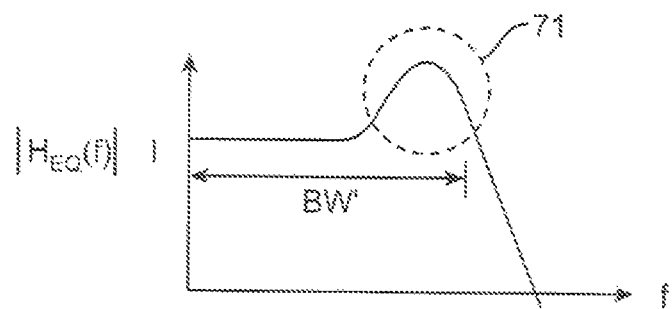
FIG. 7 is a transfer function of an illustrative equalizer in accordance with an embodiment of the present invention.

Equalizer 70 may be characterized by transfer function $H_{EQ}(f)$, as shown in FIG. 7. Equalizer 70 may be used to provide high-frequency boosting (region 71) to compensate for any undesired high-frequency signal loss. Equalizer 70 may have a finite bandwidth BW' and may attenuate high-frequency signals beyond bandwidth BW'.

Figure 8A:
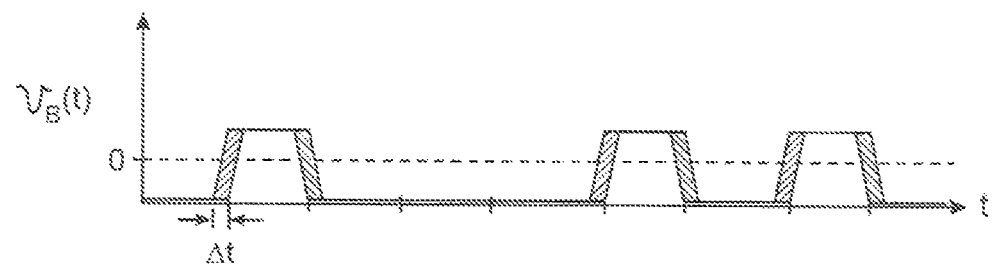
FIG. 8A is a timing diagram of an illustrative data stream at an input of a transmit driver in accordance with an embodiment of the present invention.

A data signal such as differential signal $v_B(t)$ may be present at the output of equalizer 70 (e.g., point B), as shown in FIG. 8A. Ideal input signal $v_A(t)$ of FIG. 3A may acquire undesirable jitter as it is passed through equalizer 70, because equalizer 70 is controlled by PLL 72, which has random jitter characteristics.

Figure 8B:
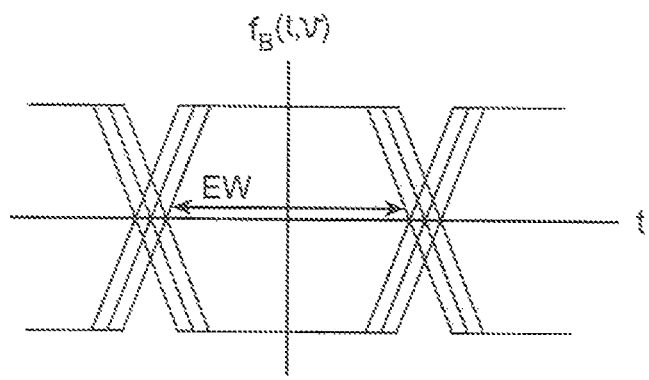
FIG. 8B is an eye diagram of the illustrative data stream of FIG. 8A in accordance with an embodiment of the present invention.

FIG. 8B shows eye diagram $f_B(t,v)$ when signal $v_B(t)$ is sampled and overlaid over one bit period. The eye pattern of $f_B(t,v)$ has at least two non-idealities. First, jitter may cause the eye to become narrower (e.g., an eye width EW is reduced) in the time domain. Second, the limited bandwidth of equalizer 70 and PLL 72 may result in finite rise/fall times that also degrade eye width EW. In simulation, eye diagram $f_B(t,v)$ may be computed by convolving eye diagram $f_A(t,v)$ with PDF $f_F(t)$ and with $h_{EQ}(t)$ (e.g., a fast Fourier transform of $H_{EQ}(f)$), as shown in equation 2.

$$f_B(t,v) = f_A(t,v) * f_F(t) * h_{EQ}(t) \quad (2)$$

Figure 9:
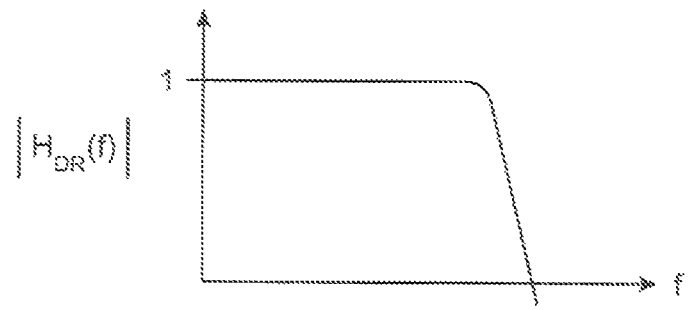
FIG. 9 is a transfer function of an illustrative transmit driver in accordance with an embodiment of the present invention.
Figure 10:
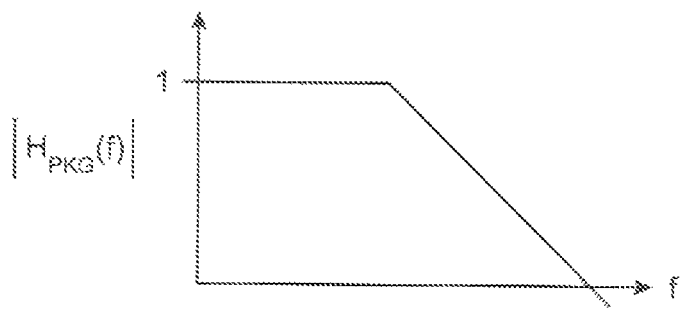
FIG. 10 is a transfer function of an illustrative transmit package circuitry in accordance with an embodiment of the present invention.

FIGS. 9 and 10 show transfer functions (i.e., magnitude frequency responses) $|H_{DR}(f)|$ and $|H_{PKG}(f)|$ of driver 78 and package 94, respectively. Transfer functions $|H_{DR}(f)|$ and $|H_{PKG}(f)|$ may represent magnitude responses as a function of frequency and may both have low-pass characteristics. Transfer functions $|H_{DR}(f)|$ and $|H_{PKG}(f)|$ may have different bandwidths and may roll off (e.g., decrease in magnitude as frequency increases) at different rates.

Figure 11A:
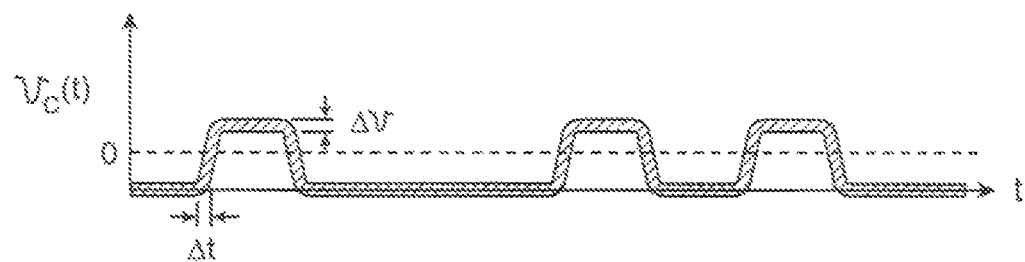
FIG. 11A is a timing diagram of an illustrative data stream with jitter and noise at an output of a transmit driver in accordance with an embodiment of the present invention.

As shown in FIG. 11A, a differential signal such as signal $v_C(t)$ may be present at the output of driver 78 (e.g., point C). Signal $v_B(t)$ of FIG. 8A may acquire undesirable noise (e.g., variation in amplitude in the voltage domain as indicated by noise $\Delta v$) as it is passed through driver 78. Driver 78 is powered by power supply lines 100 and 102 that may suffer from power supply variation and noise (e.g., variation and noise in supply voltages Vcc and Gnd). Random noise generated in this way may be characterized by noise function $f_{DR}(v)$.

Figure 11B:
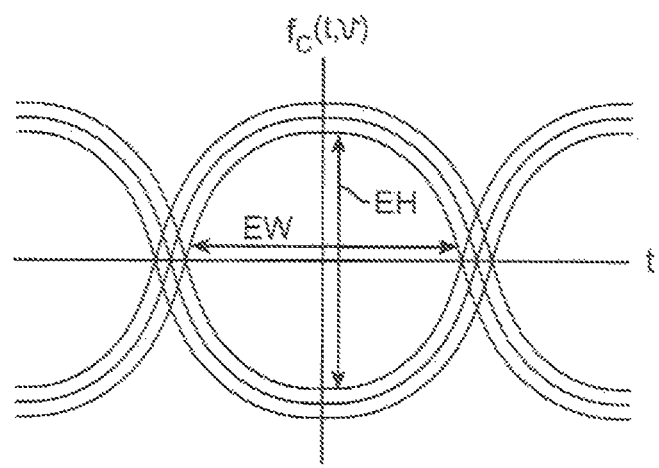
FIG. 11B is an eye diagram of the illustrative data stream of FIG. 11A in accordance with an embodiment of the present invention.

FIG. 11B shows eye diagram $f_C(t,v)$ when signal $v_C(t)$ is sampled and overlaid with itself. The eye pattern of $f_C(t,v)$ is further degraded. First, noise may cause the eye to become shorter (e.g., an eye height EH is reduced) in the voltage domain. Second, the limited bandwidth of driver 78 may result in longer rise/fall times that further degrade eye width EW. In simulation, eye diagram $f_C(t,v)$ may be calculated by convolving eye diagram $f_B(t,v)$ with $h_{DR}(t)$ (e.g., an inverse Fourier transform of $|H_{DR}(f)|$), and noise function $f_{DR}(v)$, as shown in equation 3.

$$f_C(t,v) = f_B(t,v) * h_{DR}(t) * f_{DR}(v) \quad (3)$$

Figure 12A:
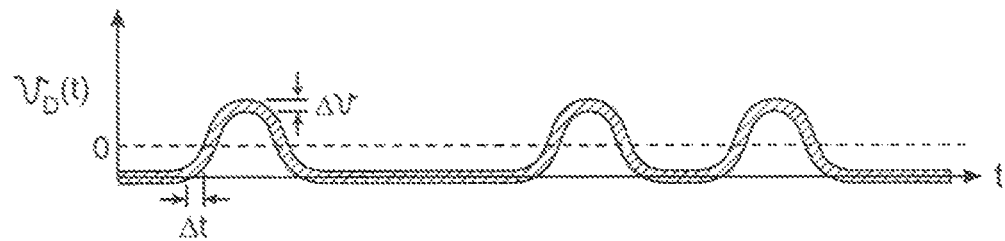
FIG. 12A is a timing diagram of an illustrative data stream with jitter and noise at an input terminal of a channel in accordance with an embodiment of the present invention.

As shown in FIG. 12A, a signal such as differential signal $v_D(t)$ may be present at the output of package 94 (e.g., point D). The output of package 94 corresponds to the interface that connects TX circuitry 62 to channel 66. Signal $v_D(t)$ of FIG. 12A may be further degraded by the low-pass characteristic of package 94.

Figure 12B:
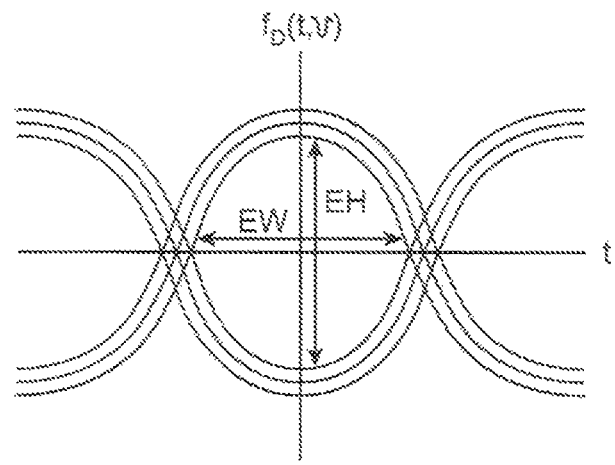
FIG. 12B is an eye diagram of the illustrative data stream of FIG. 12A in accordance with an embodiment of the present invention.

FIG. 12B shows eye diagram $f_D(t,v)$ when signal $v_D(t)$ is sampled and overlaid on itself. The limited bandwidth of package 78 may result in even longer rise/fall times that further close the eye pattern (i.e., reduce eye width EW). In simulation, eye diagram $f_D(t,v)$ may be determined by convolving eye diagram $f_C(t,v)$ with $h_{PKG}(t)$ (e.g., an inverse fast Fourier transform of $|H_{PKG}(f)|$), as shown in equation 4.

$$f_D(t,v) = f_C(t,v) * h_{PKG}(t) \quad (4)$$

Signals shown in eye diagram $f_D(t,v)$ may represent the actual signals that are provided to channel 66 for transmission to RX circuitry 64.

The link simulation tool may perform convolution calculations of the type shown in equations 1-4 to model the behavior of TX circuitry 62. The link simulation tool may perform two-dimensional (2D) convolution (e.g., convolution with two independent variables). This allows processing of model functions that are dependent on both time and voltage. Performing 2D convolution for deterministic and random signal components using this approach may achieve superior accuracy over convention 1D convolution methods.

FIGS. 2-12 and equations 1-4 merely serve to illustrate one possible approach of modeling TX circuitry 64. RX circuitry 64 may be modeled with this type of approach using a schematic setup of the type shown in FIG. 2 and using 2D convolution computations of the type shown in equations 1-4. If desired, all the data signals may be single-ended.

Channel 66 generally does not introduce random noise or jitter, because it only includes passive elements. Channel 66 may therefore be represented by a transfer function having a low-pass characteristic.

The link simulation tool may compute the behavior of communications link 10 as a system by convolving the results of each of the subsystems of link 10 (e.g., by convolving the characteristic functions of circuitry 62, circuitry 64, and channel 66). Convolving the characteristic functions in this way produces an overall link characteristic function that can be used to determine the performance of the entire link system.

Figure 13:
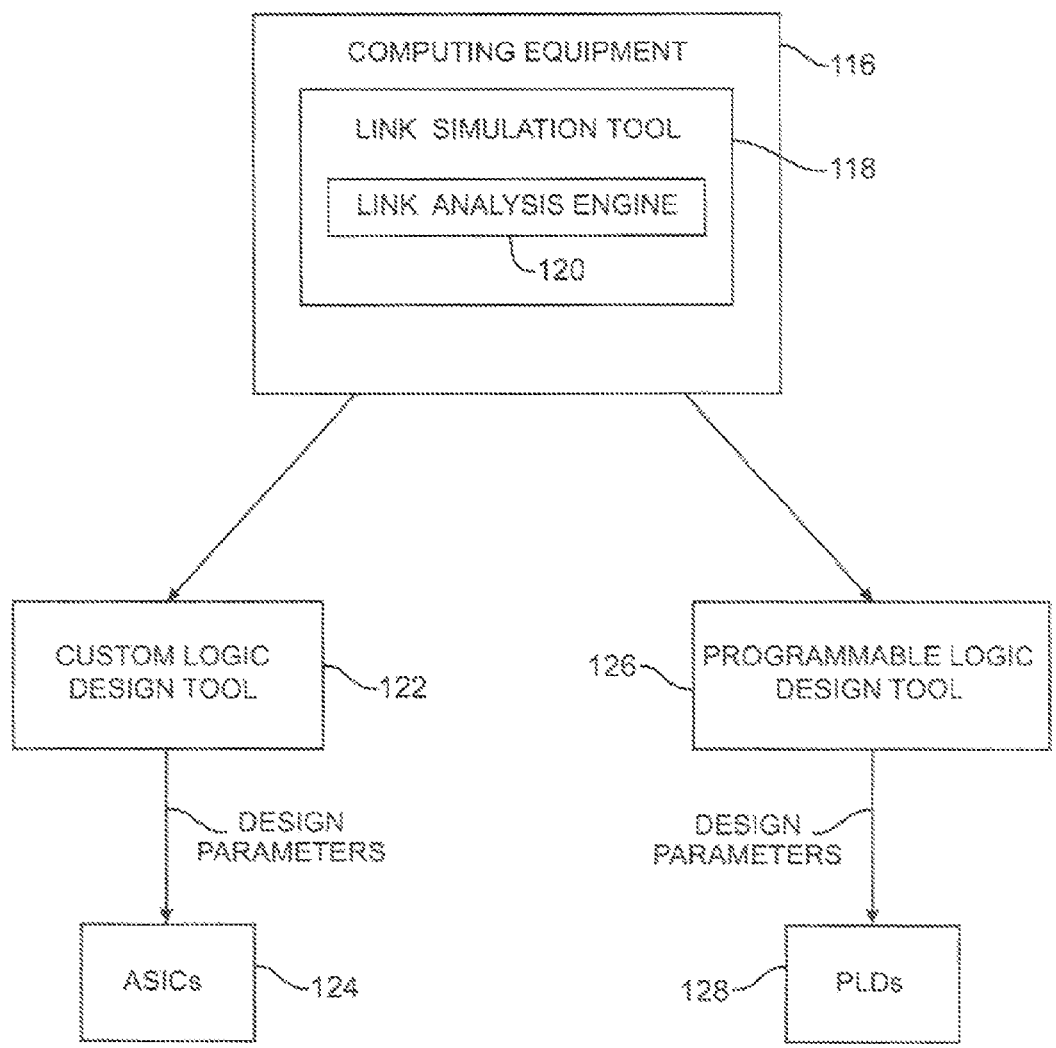
FIG. 13 is a diagram showing how an illustrative link simulation tool may be used to design custom logic and programmable logic circuits in accordance with an embodiment of the present invention.

As shown in FIG. 13, a link simulation tool such as link simulation tool 118 may be run on computing equipment such as computing equipment 116. Link simulation tool 118 may include a link analysis engine such as link analysis engine 120. Link analysis engine may be used to perform 2D convolution computations, BER calculations, and other desired operations. Computing equipment 116 may be based on any suitable computer or network of computers. With one suitable arrangement, computing equipment 116 includes a computer that has sufficient processing circuitry and storage to run link simulation tool 118 and store corresponding simulation results. Equipment 116 may have a display and user input interface for gathering user input and displaying modeling results to a user.

Link simulation tool 118 may provide information to a custom logic design tool such as custom logic design tool 122, a programmable logic design tool such as programmable logic design tool 126, or other suitable computer-aided design tools. Based on the information provided by link simulation tool 118, design tools 122 and 126 may be used to provide design parameters to help design high-speed I/O communications links in application-specific integrated circuits 124 and programmable logic devices 128, respectively.

Figure 14:
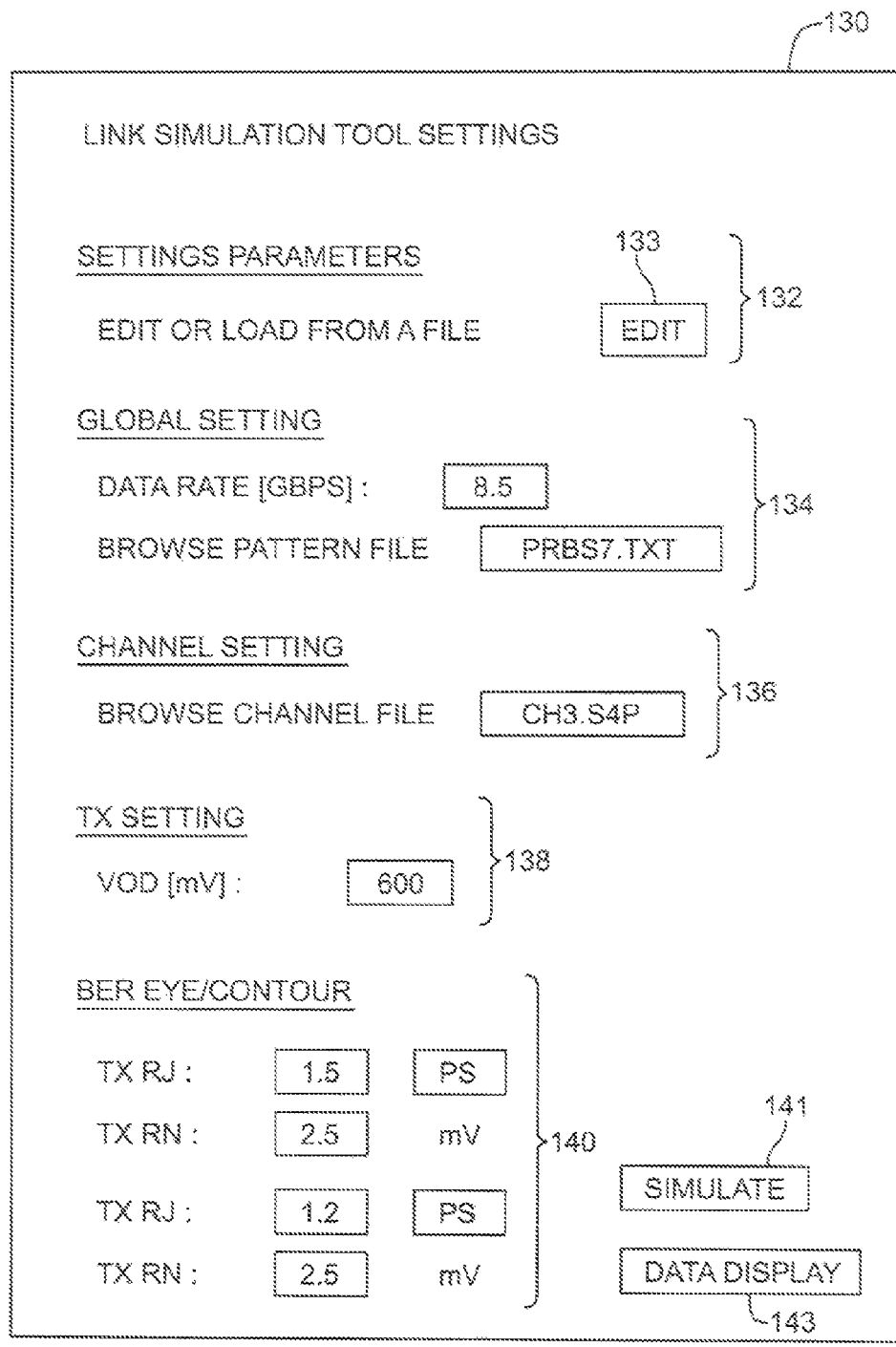
FIG. 14 is an illustrative input screen that may be presented to provide a user with an opportunity to input link simulation tool settings in accordance with an embodiment of the present invention.

An illustrative input screen 130 that may be provided to a system designer or other user by simulation tool 118 is shown in FIG. 14. Screen 130 may provide the user with an opportunity to input link simulation tool settings. Screen 130 may be displayed on a computer monitor or other I/O device (computing equipment 116).

Input screen 130 may have an input region such as settings parameters input region 132. Input region 132 may allow the user to choose to manually edit or load from a file the remaining link simulation tool settings. A drop-down menu or other interface may be invoked by clicking on edit option 133 to allow the user to select between available options.

Input screen 130 may have another input region such as global setting input region 134. Input region 134 may allow the user to specify a desired data rate for the communications link and to specify a desired browse pattern file (e.g., a file that includes the desired data bit sequence for transmission). Input region 134 may include fillable text boxes or other input options that allow the user to specify desired global settings. In the example of FIG. 14, the user has specified that link 10 must transmit data at a data rate of 8.5 Gbps and that file PRBS7.TXT is to be used. File PRBS7.TXT may be a text file that includes a pseudorandom binary sequence of bits for use in a simulation (as an example).

Input screen 130 may have another input region such as channel setting input region 136. Input region 136 may allow the user to specify a desired channel file (e.g., a file that includes parameters that model the passive behaviors of a particular channel). In the example of FIG. 14, the user has specified in a fillable text box that channel file CH3.S4P is to be used to simulate channel 66.

Input screen 130 may have another input region such as TX setting input region 138. Input region 138 may allow the user to specify a desired output differential voltage (VOD) level at the output of driver 78. This VOD level may represent a peak-to-peak voltage difference between a high transmit signal value and a low transmit signal value (see, e.g., eye height EH of FIG. 12B). Higher VOD levels translate to stronger signals (e.g., signals having larger amplitudes) at the cost of increased power consumption at the transmitter. In the example of FIG. 14, the user has specified in a fillable text box a VOD level of 600 mV.

Input screen 130 may have another input region such as BER eye/contour input region 140. Input region 140 may allow the user to specify desired random jitter (RJ), random noise (RN), and other jitter and noise component levels (e.g., duty cycle distortion, etc.) at the transmitter and at the receiver. The RJ levels may be supplied in units of time (e.g., picoseconds) while the RN levels may be supplied in units of signal amplitude (e.g., millivolts). The random jitter and noise levels directly affect the eye diagram and associated BER plots at any point within link 10. In the example of FIG. 14, the user has specified in fillable text boxes that a TX RJ level of 1.5 ps, a TX RN level mV, an RX RJ level of 1.2 ps, and an RX RN level of 2.5 mV be used in simulations.

These input regions on input screen 130 are merely illustrative. Additional input regions to specify link simulation tool 118 with more settings or options may be incorporated, if desired.

The user may click on a menu button such as button 141 to direct link simulation tool 118 to simulate the operation of communications link 10 based on the link simulation tool settings specified on input screen 130. After simulation is complete, the user may click on a menu button such as data display button 143 to display another screen such as data display screen 142 of FIG. 15.

Figure 15:
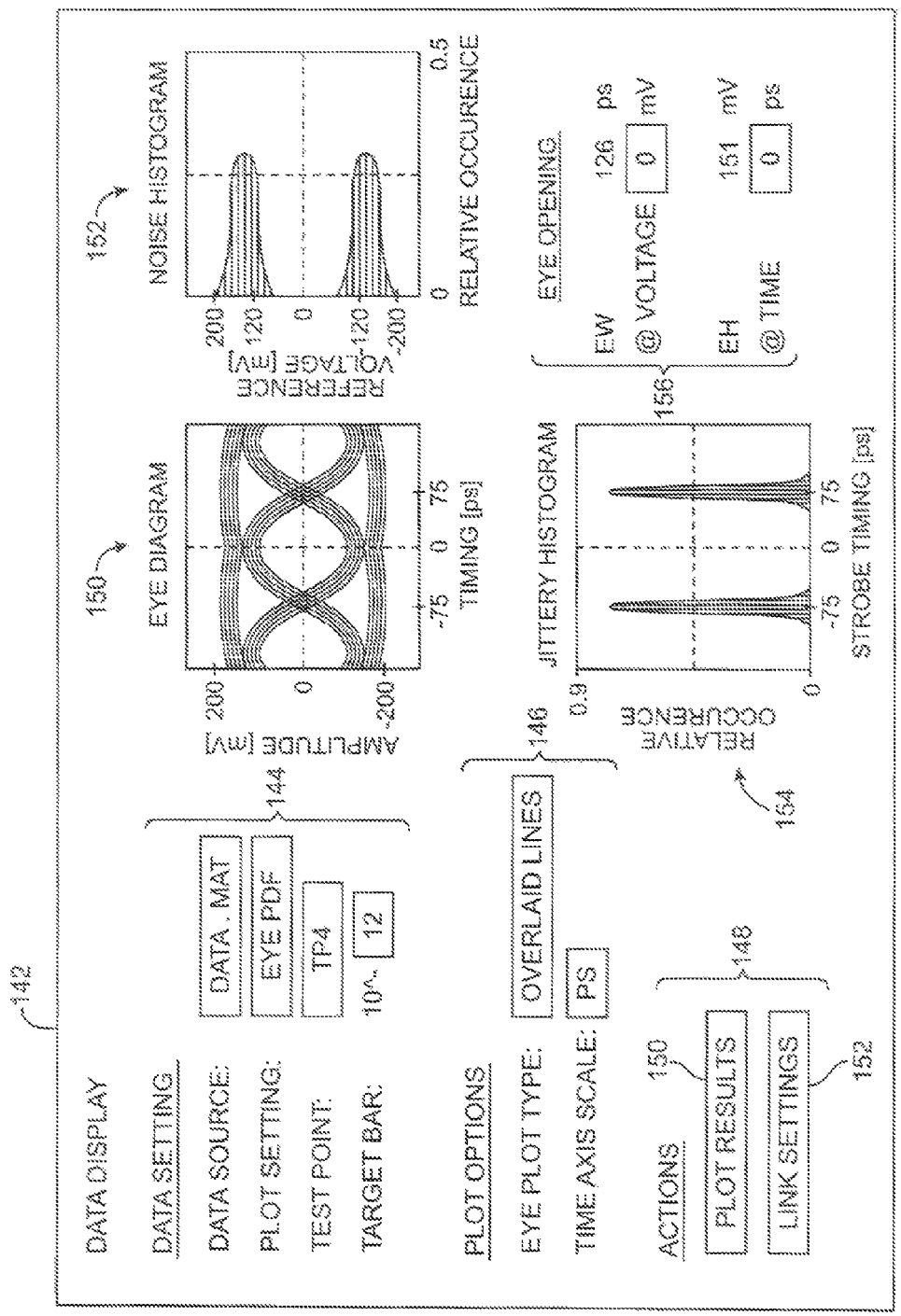
FIGS. 15 and 16 are illustrative data display screens that may be presented to provide a user with an opportunity to select desired display options in accordance with an embodiment of the present invention.

Display screen 142 of FIG. 15 may have an input region such as data setting input region 144. Input region 144 may allow the user to specify a desired data source file, plot setting, test point, and target BER. The data source file may be an output file containing corresponding simulation results. The plot setting reflects the type of plot that is used to display the simulation results. The desired test point refers to a particular point of interest in communications link 10. Waveforms or plots that are displayed on display screen 142 may be specific to the selected test point. In the example of FIG. 15, the user has specified in fillable text boxes that data source file DATA-.MAT be used, that waveforms at test point TP4 (e.g., at the output of equalizer 82) should be displayed using an "eye PDF" plot type, and that link 10 exhibit a BER of less than $10^{-12}$.

Display screen 142 may have another input region such as plot options input region 146. Input region 146 may allow the user to specify a desired plot type and time axis scale. In the example of FIG. 15, the user has specified in drop-down menus that overlaid lines be used as the desired plot type (e.g., a plot type that is used to display 2D eye diagrams) and that the time axis scale be in units of picoseconds (ps).

Display screen 142 may have another input region such as actions input region 148. Input region 148 may have menu buttons such as plot results button 150 and link settings button 152. Selecting plot results button 150 may direct display screen 142 to display waveforms/plots corresponding to the desired data settings and plot options specified in input regions 144 and 146. Selecting link settings button 152 may launch input screen 130 to give the user the opportunity to alter any link simulation tool settings as desired.

Display screen 142 may display an eye diagram such as eye diagram 150. Eye diagram 150 may be a 2D plot (e.g., plotting amplitude in mV versus timing in ps) with overlaid waveforms at test point TP4 (as an example).

Because the plot setting of "eye PDF" is selected in this example, display screen 142 may plot probability density functions such as noise histogram 152 and jitter histogram 154. Noise histogram 152 may plot the relative occurrence of reference voltage at a center strobe timing (i.e., zero ps). The peaks of the noise histogram plot correspond to nominal amplitudes of the transmitted signals at TP4. For example, the nominal signal amplitudes are 120 mV and −120 mV, as shown in FIG. 15. The spread or deviation from these peaks indicates the amount of noise variation that affects the amplitude of the transmitted signals.

Similarly, jitter histogram 154 plots the relative occurrence of crossing points at a center reference voltage (i.e., zero volts). The peaks of the jitter histogram plot correspond to nominal crossing points (e.g., where the waveforms intersect with zero reference voltage) at TP4. For example, the nominal strobe timing crossing points are at −75 ps and 75 ps, as shown in FIG. 15. The spread or deviation from these peaks indicates the amount of jitter variation that affects the timing constraints of the transmitted signals.

Data display screen 142 may include a region such as eye opening region 156. Region 156 may allow the user to specify a desired voltage value and a desired strobe time for determining eye width EW and eye height EH, respectively. In the example of FIG. 15, the user has chosen to measure eye width EW and height EH at the zero crossing point (i.e., 0 mV) and at the center strobe time (i.e., 0 ps). Simulation tool 118 has determined that the corresponding maximum eye width EW is 126 ps and the corresponding maximum eye height EH is 151 mV (as examples). The user may specify other reference values to determine EW and EH, if desired.

Figure 16:
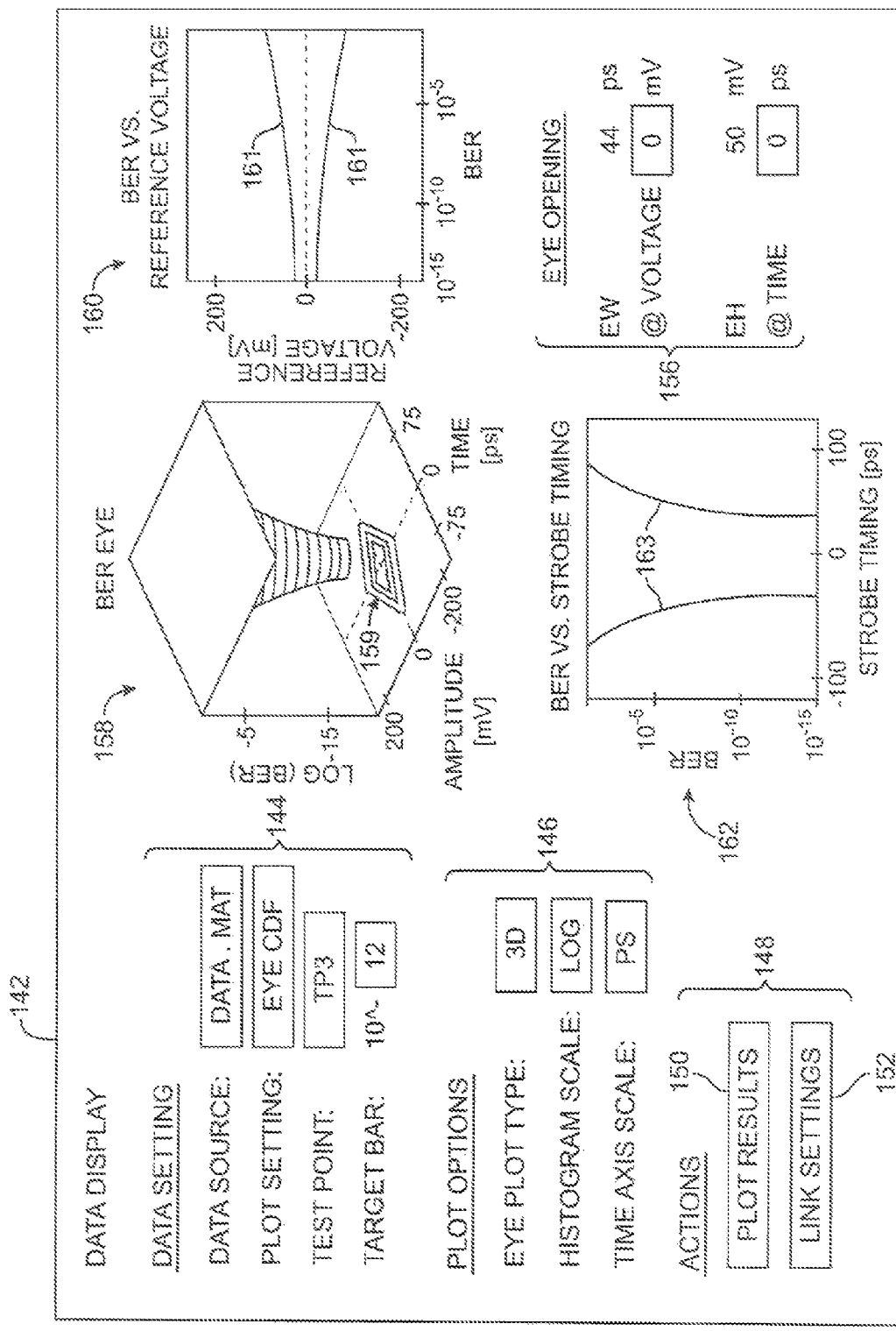

In another suitable arrangement, data display screen 142 may be configured to display a 3-dimensional BER plot and other associated plots, as shown in FIG. 16. For example, the user may opt to view an eye CDF (cumulative density function) plot setting with a 3D eye plot type and with a logarithmic (log) scale at test point TP3 (e.g., at the input of buffer 80).

Display screen 142 may therefore display a BER eye plot such as BER plot 158. BER plot 158 may be a 3D plot (e.g., plotting BER values on a log scale against amplitude and timing) at test point TP3 (as an example). A BER contour plot such as BER contour plot 159 may be formed by projecting downwards the 3D BER plot onto the 2D plane of amplitude versus time. Each horizontal cross-section of the BER plot corresponds to a particular BER value and a separate contour line of plot 159.

Because the plot setting of eye CDF is selected in this example, display screen 142 may plot cumulative density functions (CDF) such as plots 160 and 162. Curves in plots 160 and 162 may sometimes be referred to as bathtub curves. Plot 160 may plot BER (in log scale) as a function of reference voltage. In general, the BER is minimized at the zero crossing point (i.e., zero volts), because the crossing point corresponds to the maximum eye opening (width) with respect to the time axis. BER will increase at higher reference voltages, because of the random noise in the transmitted signals. In general, it is desirable for bathtub curves 161 to be far away from each other, because a wide bathtub characteristic indicates a larger eye opening for a respective axis (e.g., the time axis).

Plot 162 may plot BER as a function of strobe timing. In general, the BER in plot 162 is minimized at the center strobe timing (i.e., zero ps), because for a majority of the time, the center strobe timing corresponds to the maximum eye height in the voltage/amplitude domain. BER will increase at more distant strobe timing (i.e., timing farther away from zero ps), because of random jitter that is inherent to the transmitted signals. In the example of FIG. 16, bathtub curves 163 are relatively wider than curves 161, indicating that random noise has a more detrimental effect than the impact of random jitter in closing the eye diagram.

In the example of FIG. 16, simulation tool 118 has determined that the corresponding maximum eye width EW is 44 ps and the corresponding maximum eye height EH is 50 mV (see, e.g., eye opening region 156). These eye opening values are smaller than those shown in FIG. 15, because signals at the input of equalizer 82 (e.g., at TP3 before equalization) are more distorted than signals at the output of equalizer 82 (e.g., at TP4 after equalization).

Figure 17:
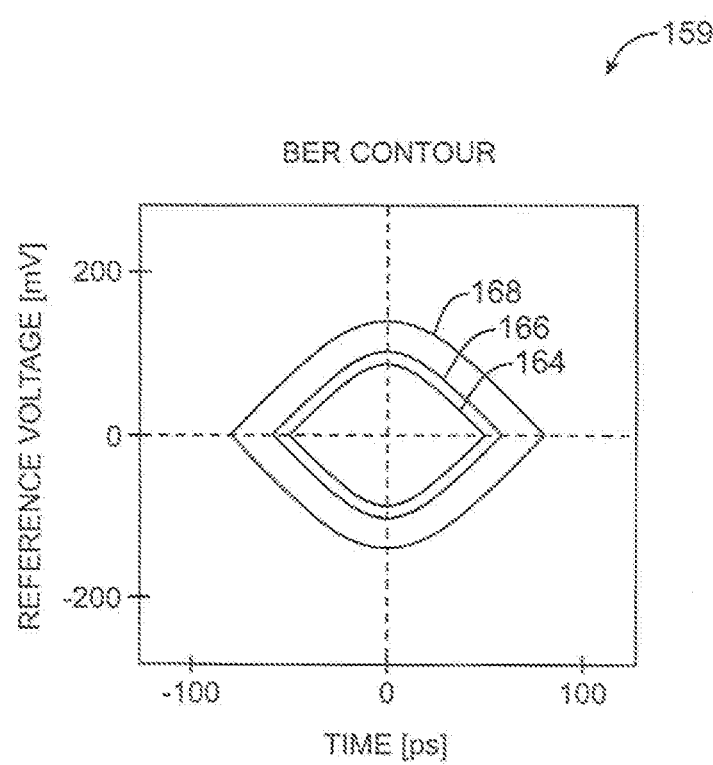
FIG. 17 is an illustrative BER (bit error rate) contour plot in accordance with an embodiment of the present invention.

As shown in FIG. 17, data display screen 142 may also be used to display BER contour plot 159 using a 2D eye plot type. Contour plot 159 plots reference voltage versus time (i.e., strobe timing). Each contour line such as line 164, 166, or 168 corresponds to an eye opening having a respective BER value. In general, same contour lines with smaller openings have higher BER values (e.g., more degraded signals) while same contour lines with wider openings have lower BER values. For example, lines 164, 166, and 168 may correspond to contour curves with BER values of $10^{-12}$, $10^{-14}$, and $10^{-16}$, respectively.

Figure 18:
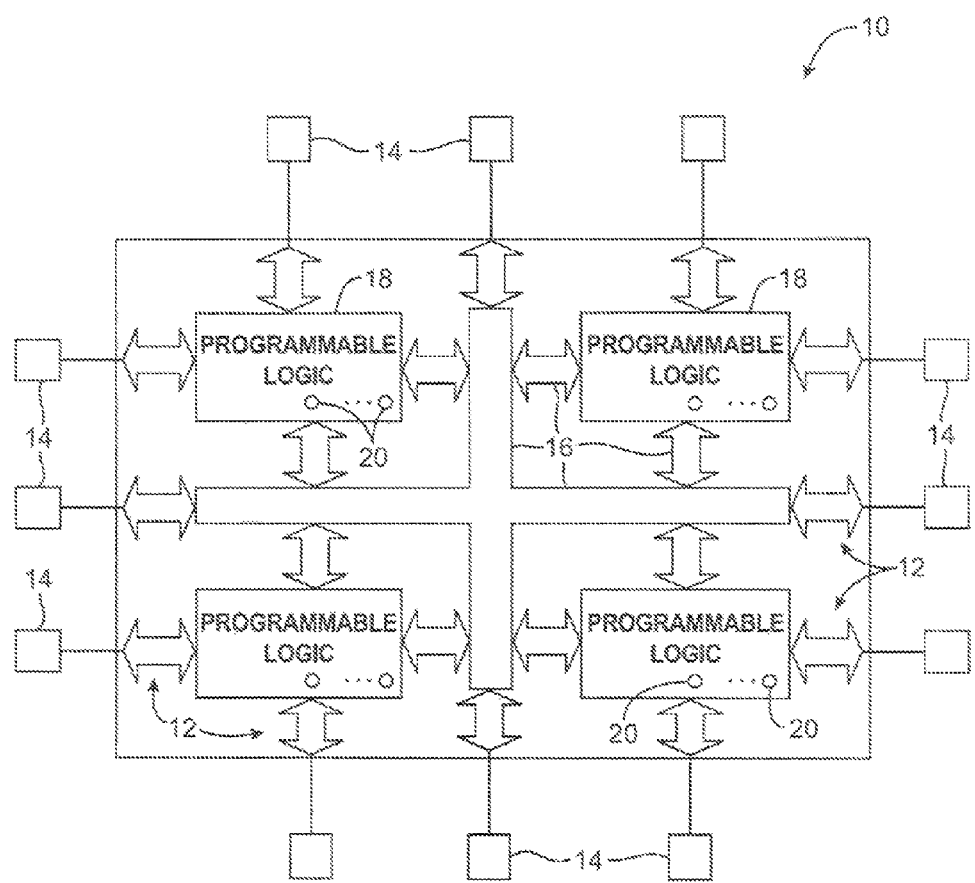
FIG. 18 is a diagram of an illustrative programmable logic device (PLD) integrated circuit in accordance with the present invention.

Link simulation tool 118 may be used to design a communications link in a programmable logic device integrated circuit. An illustrative programmable logic device 10 is shown in FIG. 18. Programmable logic device 10 may have input/output circuitry 12 for driving signals off of device 10 and for receiving signals from other devices via input/output pins 14. Programmable logic 18 may include combinational and sequential logic circuitry and may be interconnected using fixed and programmable interconnects 16.

Programmable logic devices contain programmable elements 20. In general, programmable elements 20 may be based on any suitable programmable technology, such as fuses, antifuses, electrically-programmable read-only-memory technology, random-access memory cells, etc.

Programmable elements 20 each provide a corresponding static control output signal that controls the state of an associated logic component in programmable logic 18. The output signals are typically applied to the gates of metal-oxide-semiconductor (MOS) transistors.

Figure 19:
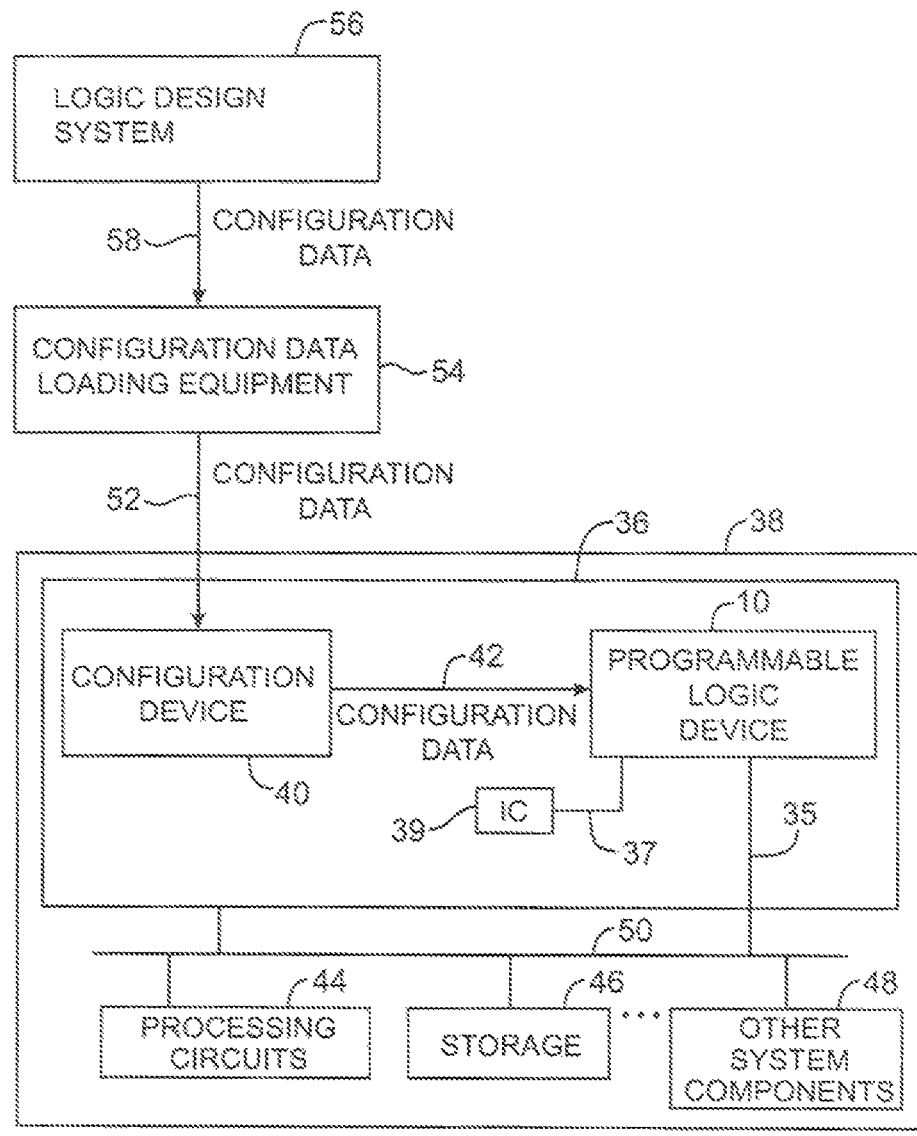
FIG. 19 is a diagram showing how programmable logic device configuration data is created by a logic design system and loaded into a programmable logic device to configure the device for operation in a system in accordance with the present invention.

An illustrative system environment for a programmable logic device 10 is shown in FIG. 19. Programmable logic device 10 may be mounted on a board 36 in a system 38. Programmable logic device 10 may receive configuration data from programming equipment or from any other suitable equipment or device. In the example of FIG. 19, programmable logic device 10 is the type of programmable logic device that receives configuration data from an associated integrated circuit 40. With this type of arrangement, circuit 40 may, if desired, be mounted on the same board 36 as programmable logic device 10. The circuit 40 may be an erasable-programmable read-only memory (EPROM) chip, a programmable logic device configuration data loading chip with built-in memory (sometimes referred to as a configuration device), or any other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings. As shown in the example of FIG. 19, communications paths are used to interconnect device 10 to other components. For example, communications path 37 is used to convey data between an integrated circuit 39 that is mounted on board 36 and programmable logic device 10. Communications paths 35 and 50 are used to convey signals between programmable logic device 10 and components 44, 46, and 48.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. As shown in FIG. 19, the configuration data produced by a logic design system 56 may be provided to equipment 54 over a path such as path 58. Equipment 54 provides the configuration data to device 40, so that device 40 can later provide this configuration data to the programmable logic device 10 over path 42. System 56 may be based on one or more computers and one or more software programs. In general, software and data may be stored on any computer-readable medium (storage) in system 56.

In a typical scenario, logic design system 56 is used by a logic designer to create a custom circuit design based on simulation results from simulation tool 118 (and, if desired, can be used to implement the functions of link simulation tool 118). System 56 produces corresponding configuration data which is provided to configuration device 40. Upon power-up, configuration device 40 and data loading circuitry on programmable logic device 10 is used to load the configuration data into the CRAM cells 20 of device 10. Device 10 may then be used in normal operation of system 38.

Figure 20:
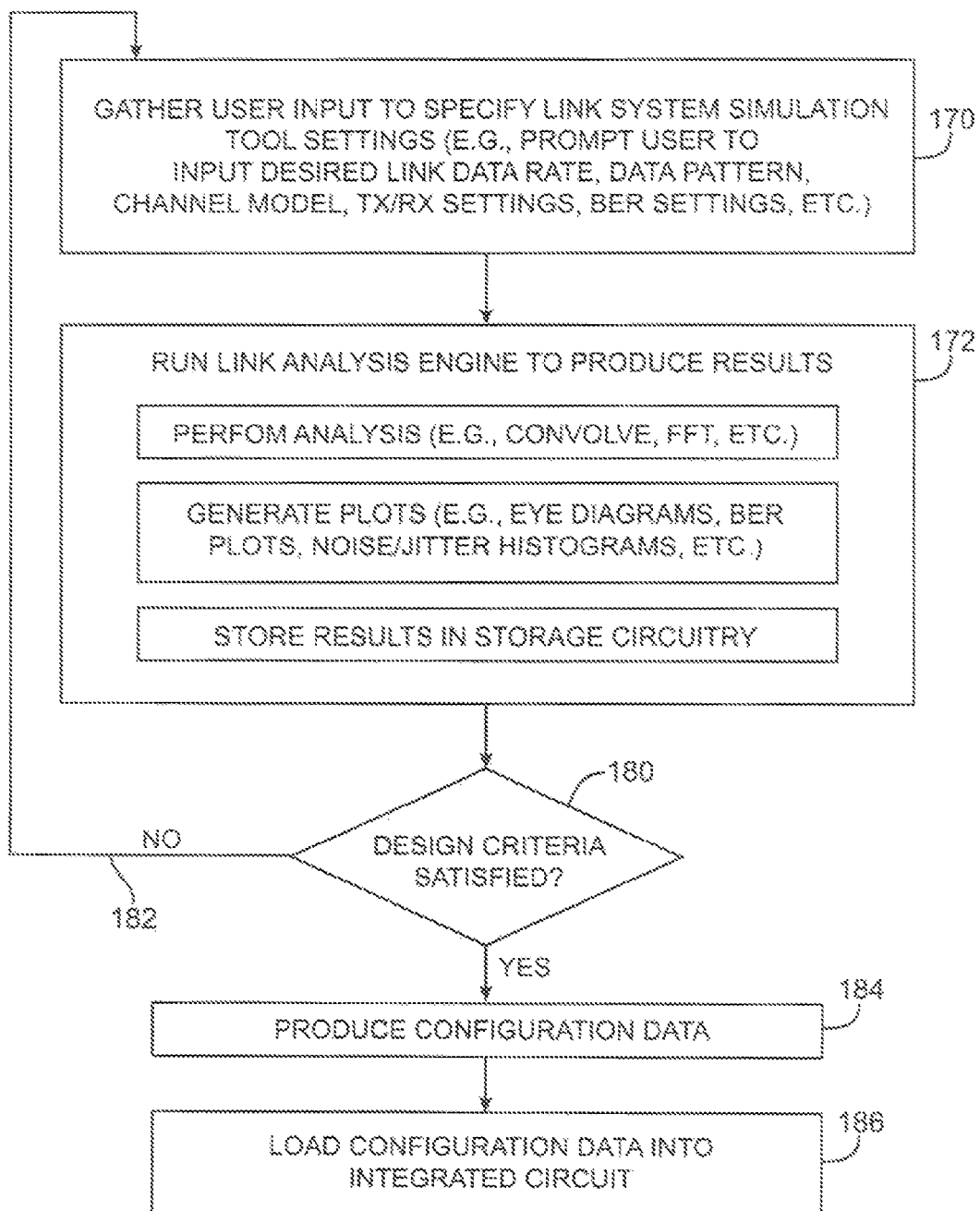
FIG. 20 is a flow chart of illustrative steps involved in running a communications link simulation tool of the type shown in FIG. 13 in accordance with an embodiment of the present invention.

FIG. 20 shows illustrative steps involved in using link simulation tool 118 to simulate communications link 10. At step 170, tool 118 may provide a user with an opportunity to specify link system simulation tool settings (e.g., tool 118 may prompt a user to input a desired link date rate, data pattern file, channel model, TX/RX settings, BER settings, etc.).

At step 172, link simulation tool 118 may run link analysis engine 120 to produce simulation results. The running of link analysis engine 120 may involve performing mathematical computations (e.g., 2D convolution operations, fast Fourier transforms, etc.), generating and displaying plots (e.g., eye diagrams, BER plots, noise/jitter histograms, etc.), and storing results in storage circuitry in the computing equipment that runs tool 118 (as examples).

Link simulation tool 118 may generate simulation results. The simulation results may be displayed on a screen such as the data display screen shown in FIGS. 15 and 16. The simulation results may or may not satisfy design criteria depending on the requirements of the systems designer (step 180). If the simulated results (e.g., eye width, eye height, jitter/noise histograms, BER contour plots, etc.) does not satisfy design criteria, processing may loop back to step 170 so that the design can be refined, as indicated by path 182.

If the simulation results satisfy design criteria, link simulation tool 118 may supply output results to ASIC (application-specific integrated circuit) or PLD (programmable logic device) CAD tools such as system 56. These tools (e.g., system 56) may then produce configuration data, masks for an ASIC, etc. (step 184). Configuration data may be loaded onto a programmable integrated circuit such as programmable logic device integrated circuit 10 of FIG. 18 (step 186). A programmable integrated circuit configured in this way will exhibit the desired link performance specified by the designer using link simulation tool 118 and system 56.

Link simulation tool 18 may be used to simultaneously simulate any number of communications links. Link simulation tool 118 serves as a generic, end-to-end statistical link simulator that can be used to design any desired high-speed communications link architecture. Link simulation tool 118 may provide coverage of any desired signal distortion/impairment mechanism (e.g., lossy medium, reflection, cross talk, interference, etc.) that affects overall link performance. Using link simulation tool 118 to design a high-speed communications link helps provide accurate and rapid link system architecture evaluation and selection results and helps provide fast performance and cost optimization results for link system and subsystem design.

The foregoing is merely illustrative of the principles of this invention and various modifications can be made by those skilled in the art without departing from the scope and spirit of the invention.

What is claimed is:

1. A method of simulating a communications link using a link simulation tool implemented on computing equipment, wherein the communications link includes respective link subsystems and wherein the link subsystems in the communications link are represented by subsystem models in the link simulation tool, the method comprising:

performing two-dimensional convolution operations on the subsystem models to determine link performance for the communications link using the link simulation tool, wherein the two-dimensional convolution comprises convolution on expressions that are a function of time and voltage, wherein the link subsystems comprise a transmitter subsystem that is represented by a transmitter subsystem model in the link simulation tool, and wherein performing the two-dimensional convolution operations comprises performing two-dimensional convolution operations with the transmitter subsystem model.

2. The method defined in claim 1, wherein the link subsystems comprise a receiver subsystem that is represented by a receiver subsystem model in the link simulation tool and wherein performing the two-dimensional convolution operations further comprises performing two-dimensional convolution operations with the receiver subsystem model.

3. The method defined in claim 2, wherein the transmitter and receiver subsystems comprise transmitter and receiver subsystem components each of which is represented by a respective one of a plurality of characteristic functions, the method further comprising:

performing two-dimensional convolution operations on the plurality of characteristic functions.

4. The method defined in claim 3, wherein the transmitter subsystem components of the communications link comprise components including: a first equalizer, a first phase-locked loop, a first oscillator, and a driver, and wherein the receiver subsystem components comprise components including: a buffer, a second equalizer, a second phase-locked loop, and a second oscillator.

5. The method defined in claim 4, wherein performing the two-dimensional convolution operations on the characteristic functions comprises:

convolving the characteristic functions of the first equalizer, the first phase-locked loop, the first oscillator, and the driver to produce the transmitter subsystem model; and convolving the characteristic functions of the buffer, the second equalizer, the second phase-locked loop, and the second oscillator to produce the receiver subsystem model.

6. The method defined in claim 1, wherein the link subsystems comprise a channel subsystem that is represented by a channel subsystem model in the link simulation tool and wherein performing the two-dimensional convolution operations further comprises performing two-dimensional convolution operations with the channel subsystem model.

7. A method of simulating a communications link using a link simulation tool that is implemented on computing equipment, comprising:

with the link simulation tool, displaying a timing diagram for transmitted signals having varying signal amplitudes at a given point in the communications link;

with the link simulation tool, displaying a probability density function plot that represents a distribution of signal amplitude variations in the transmitted signals for the communications link; and with the link simulation tool, displaying a first cumulative density function plot that is only a function of voltage and a second cumulative density function plot that is only a function of time.

8. The method defined in claim 7, wherein displaying the timing diagram comprises displaying an eye diagram of the transmitted signals of the communications link.

9. The method defined in claim 7, wherein displaying the probability density function plot comprises displaying a noise histogram plot for the transmitted signals for the communications link.

10. The method defined in claim 9 further comprising:

with the link simulation tool, displaying a jitter histogram plot for the transmitted signals for the communications link.

11. The method defined in claim 7 further comprising:

with the link simulation tool, displaying a three-dimensional bit error rate plot for the transmitted signals at the given point in the communications link.

12. A method of simulating a communications link using a link simulation tool implemented on computing equipment, comprising:

with the link simulation tool, providing a user with an opportunity to specify random jitter requirements for the communications link;

with the link simulation tool, providing the user with an opportunity to specify random noise requirements for the communications link;

with the link simulation tool, producing simulation results for the communications link based on the random jitter and noise requirements specified by the user; and with the link simulation tool, providing the user with an opportunity to specify a target bit error rate for the communications link.

13. The method defined in claim 12 further comprising:

with the link simulation tool, providing the user with an opportunity to specify a data rate for the communications link.

14. The method defined in claim 12, wherein producing the simulation results comprises displaying jitter and noise probability density function plots that are based on the random jitter and noise requirements specified by the user for the communications link.

15. A non-transitory computer-readable storage media for simulating performance in a communications link, comprising instructions for:

providing a user with an opportunity to specify link simulation settings for the communications link;

performing two-dimensional convolution operations to simulate performance in the communications link, wherein the two-dimensional convolution comprises convoluting a first function that is dependent on time with a second function that is dependent on voltage, wherein the communications link includes a transmitter subsystem that is represented by a transmitter subsystem model, and wherein performing the two-dimensional convolution operations comprises performing two-dimensional convolution operations with the transmitter subsystem model; and displaying simulation results for the communications link produced by performing the two-dimensional convolution operations.

* * * * *